United States Patent [19]

Shimonaka et al.

[11] Patent Number: 5,477,319
[45] Date of Patent: Dec. 19, 1995

[54] OPTICAL HETERODYNE DETECTION METHOD AND APPARATUS UTILIZING A SCATTERED REFERENCE BEAM

[75] Inventors: Atsushi Shimonaka, Ikoma; Tatsuya Morioka, Tenri; Mototaka Taneya, Nara; Hidenori Kawanishi, Nara; Haruhisa Takiguchi, Nara, all of Japan

[73] Assignee: Sharp Kabushiki Kaisha, Osaka, Japan

[21] Appl. No.: 171,478

[22] Filed: Dec. 22, 1993

[30] Foreign Application Priority Data

Dec. 28, 1992 [JP] Japan .................................. 4-349403
Sep. 16, 1993 [JP] Japan .................................. 5-230585

[51] Int. Cl.⁶ ...................................................... G01B 9/02
[52] U.S. Cl. ................................................ 356/349; 356/345
[58] Field of Search ..................................... 356/349, 359, 356/360, 28.5, 345

[56] References Cited

U.S. PATENT DOCUMENTS 3,712,706  1/1973  Stamm ................................. 359/531
4,913,547  4/1990  Moran ................................. 356/349
4,962,431 10/1990  Imakawa et al. .................... 358/296
5,353,109 10/1994  Langdon et al. .................... 356/349

FOREIGN PATENT DOCUMENTS 0235102 11/1985 Japan .
64-39139  2/1989 Japan .

OTHER PUBLICATIONS

Harada et al, "A Study of Beam Tracking Schemes Robust to Optical Background Noise in Optical Intersatellite Links (ISLs)", IEICE Technical Report, Sep. 28, 1989.

Primary Examiner—Samuel A. Turner
Assistant Examiner—Robert Kim
Attorney, Agent, or Firm—Nixon & Vanderhye

[57] ABSTRACT

An optical heterodyne detection method of detecting a beat signal by heterodyne detection using a superimposition of two or more beams of light including a signal beam and a reference beam, includes the steps of: generating a scattered reference beam from the reference beam: and detecting the beat signal obtained from the scattered reference beam and the signal beam, by superimposing the scattered reference beam and the signal beam.

25 Claims, 13 Drawing Sheets

OPTICAL HETERODYNE DETECTION METHOD AND APPARATUS UTILIZING A SCATTERED REFERENCE BEAM

BACKGROUND OF THE INVENTION

1. Field of the Invention

The present invention relates to an optical heterodyne detection method and an optical heterodyne detecting apparatus for detecting a beat caused by the difference in frequency (referred to as a "beat signal" hereinafter) between two light rays superimposed with each other, or detecting the intensity modulation caused by the difference in phase between the two light rays by using a light receiving element. More particularly, this invention relates to an optical heterodyne detection method and an optical heterodyne detecting apparatus capable of detecting the beat signal (or the intensity modulation signal) regardless of the angular deviation between wavefronts of two light rays, i.e., a signal beam and a reference beam.

2. Description of the Related Art

By utilizing optical characteristics of light such as coherence, multiplexing and high velocity, various kinds of optical instruments such as optical communication apparatus and high accuracy distance measuring instruments have been developed so far. Especially in recent years, a spatial tracking system has been developed as a future optical communication apparatus for realizing a high-speed and large capacity communication between satellites or between a satellite and a space airframe.

In this type of optical communication apparatus, light receiving techniques for receiving a signal beam is important. For example, an optical heterodyne detection method utilizing the coherence of light is one of such light receiving techniques. The practical use of the optical heterodyne detection method was facilitated by the introduction of a laser, which serves as a light source of single-wavelength and superior coherence.

The optical heterodyne detection method used in wireless optical communication will be described hereinafter. Two electric fields formed by two coherent light beams (referred to as a signal beam and a reference beam hereinafter), whose polarizing planes and wavefronts are aligned with each other, are called $E_1$ and $E_2$, respectively. Then, the electric field $E_1$ of the signal beam and the electric field $E_2$ of the reference beam are represented by the following Formula 1 and Formula 2, respectively:

$$E_1 = A_1 \exp[i(2\pi v_1 t + \phi_1)] \quad \text{Formula 1}$$

$$E_2 = A_2 \exp[i(2\pi v_2 t + \phi_2)] \quad \text{Formula 2}$$

$v_1$: frequency of signal beam
$v_2$: frequency of reference beam
$\phi_1$: phase of signal beam
$\phi_2$: phase of reference beam
$A_1$: amplitude of signal beam
$A_2$: amplitude of reference beam An optical current intensity I observed by a light receiving element, to which the signal beam and the reference beam are guided, is obtained by mixing both beams together and then squaring the mixed result for performing an optical detection:

$$I = |E_1 + E_2|^2 = A_1^2 + A_2^2 + 2A_1 A_2 \cos[2\pi(v_1 - v_2)t + \phi_1 - \phi_2] \quad \text{Formula 3}$$

As is apparent from this Formula 3, the optical current intensity I is composed of the amount of direct current and the beat signal on the frequency of $(v_1 - v_2)$. Accordingly, it is essential to detect the beat signal in the optical heterodyne detection method.

In general, the optical communication system is so arranged that the signal beam is transmitted from the transmitter side and the reference beam is emitted from the receiver side. In such an arrangement, an optical alignment technique with high accuracy is required for aligning the wavefront of the signal beam with that of the reference beam.

Now, referring to FIG. 15, it is assumed that two wavefronts of a signal beam 206 and a reference beam 202 differ from each other by δ degrees, and the optical heterodyne detection is carried out by a light receiving element 200 which includes a light receiving section having a size D. Then, an intensity $IF_x$ of the beat signal at a point x on the light receiving section is as follows:

$$IF_x = 2A_1 A_2 \cos[2\pi(v_1-v_2)t + \phi_1 - \phi_2 + 2\pi x \sin\delta/\lambda_1] \quad \text{Formula 4}$$

where $\lambda_1$ stands for the wavelength of the signal beam 206.

Also, a beat signal intensity IF with respect to the entire light receiving section is as follows:

$$\begin{aligned} IF &= \int_D IF_x dx \\ &= 2A_1 A_2 D \sin(\pi D \sin\delta/\lambda_1)/(\pi D \sin\delta/\lambda_1) \times \\ &\quad \cos[2\pi(v_1 - v_2)t + \phi_1 - \phi_2 + \pi D \sin\delta/\lambda_1] \end{aligned} \quad \text{Formula 5}$$

As is apparent from this Formula 5, the amplitude of the best signal intensity IF decreases in proportion to $\sin(\pi D \sin\delta/\lambda_1)/(\pi D \sin\delta/\lambda_1)$.

FIG. 16 shows the relationship between the light receiving section size D and an upper limit value of the deviation angle δ wherein a stable beat signal detection is ensured. This figure shows the case where the wavelength $\lambda_1$ of the signal beam 206 is 780 nm. As is apparent from FIG. 17, the upper limit value of the deviation angle δ allowing a stable beat signal detection depends on the size D of the light receiving section as well as on the wavelength $\lambda_1$ of the signal beam 206. Stable detection is assured at a deviation angle δ where the beat signal is not 0.

FIG. 17 shows the behavior of the relative intensity of the best signal intensity IF where the wavelength $\lambda_1$ is 780 nm and the size D of the light receiving section is 500 μm. In this figure, the vertical axis represents the relative intensity of the beat signal, and the horizontal axis represents the deviation angle δ of wavefronts.

As is shown by FIG. 17, as the wavefront deviation angle δ increases, the best signal intensity IF rapidly decreases to 0 at a point where δ becomes 0.089 degree. Accordingly, the detection of the beat signal is prevented even by a very small angular deviation of wavefronts of the signal beam 206 and the reference beam 202.

This problem is solved by aligning the wavefronts of the signal beam 206 and the reference beam 202. Conventionally proposed techniques realizing such an alignment are, for example, a spatial tracking system described on p. 125 of the June 1992 issue of "O plus E" or a method of using an optical coupler described on p. 100 of the January 1990 issue of the same publication.

The principle of the spatial tracking system described on the above publication will be described with reference to FIG. 18. This spatial tracking system detects the deviation angle δ between the signal beam 206 and the reference beam 202 by a quadrant detecting apparatus 201. Then, the incident angle of the reference beam 202 is mechanically controlled so that the deviation angle δ becomes 0, in such a manner that the wavefronts of the reference beam 202 and the signal beam 206 are aligned with each other.

Next, the principle of the system using the optical coupler described in the above publication will be described with reference to Fig. 19. In this system, a signal beam transmitted via a first optical fiber 204 and a reference beam transmitted via a second optical fiber 205 are guided to an optical coupler 207, and the wavefronts of both light beams are aligned with each other by the optical coupler 207.

The above spatial tracking system, however, has problems such as time-consuming operation needed for wavefront alignment of the signal beam 206 and the reference beam 202 and the large-sized structure of the system itself.

Meanwhile, in the above method using the optical coupler 207, the positional accuracy is strictly required for coupling the optical fibers 204 and 205 with the optical coupler 207. However, due to the difficulty in obtaining this positional accuracy, the wavefront alighment is not precisely performed. In addition, the method has a drawback of poor optical coupling rate.

The problems as described above will be summarized as follows:

(a) as for the spatial tracking system, an apparatus for mechenically controlling the wavefronts is required; and a time-consuming wavefront control and a large-sized system structure are also problematic;

(b) as for the method using an optical coupler, the loss of light is remarkable; and an alignment technique for highly accurate positional alignment between the optical coupler and an optical fiber is needed.

SUMMARY OF THE INVENTION

According to the present invention, an optical heterodyne detection method for detecting a beat signal by optical heterodyne detection using a superimposition of two or more beams including a signal beam and a reference beam, includes the steps of:

generating a scattered reference beam from the reference beam; and detecting the beat signal obtained from the scattered reference beam and the signal beam by superimposing the scattered reference beam and the signal beam.

In one embodiment, the beat signal corresponds to a frequency difference between the scattered reference beam and the signal beam.

In another embodiment, the beat signal corresponds to a phase difference between the scattered reference beam and the signal beam.

According to one aspect of the present invention, an optical heterodyne detecting apparatus for detecting a beat signal by an optical heterodyne detection using a superimposition of two or more beams including a signal beam and a reference beam, includes:

a first optical device for generating a scattered reference beam from the reference beam; a second optical device for mixing the scattered reference beam and the signal beam; and a third optical device for receiving the mixed beams and detecting the beat signal obtained from the scattered reference beam and the signal beam.

In one embodiment, the first optical device has a function of diffusing light and generates the scattered reference beam by the function.

In another embodiment, the first optical device is a diffusing plate.

In still another embodiment, the first optical device is a reflection type diffusing plate.

In still another embodiment, the first optical device is a multilayer lens.

In still another embodiment, the first optical device is a multilayer mirror.

In still another embodiment, the first optical device is a multilayer lens array.

In still another embodiment, the first optical device is a multilayer mirror array.

In still another embodiment, the first optical device has a function of diverging light and generates the scattered reference beam by the function.

In still another embodiment, the first optical device is one or more mirrors.

In still another embodiment, the first optical device is one or more lenses.

In still another embodiment, the first optical device is a convex mirror.

In still another embodiment, the first optical device is a concave mirror.

In still another embodiment, the first optical device has plural planes formed by a group of plane mirrors.

In still another embodiment, the first optical device is a mirror array having mirrors arranged on one plane at a regular pitch.

In still another embodiment, the first optical device is a lens array having lenses arranged on one plane at a regular pitch.

In still another embodiment, the first optical device has a function of diffracting light and generates the scattered reference beam by the function.

In still another embodiment, the first optical device is a diffraction grating having at least one hole and generating the reference beam by means of the hole.

In still another embodiment, an optical heterodyne detecting apparatus further includes:

a variable device for making the direction of the reference beam variable; and a control device for controlling the variable device on the basis of the beat signal detected by the third optical device.

In still another embodiment, the first optical device has a function of transmitting light and a function of scattering light, and provides the reference beam with an intensity distribution of a plane wave at a scattering angle.

In still another embodiment, an optical heterodyne detecting apparatus further includes:

a variable device for making the direction of the signal beam variable; and a control device for controlling the variable device on the basis of the beat signal detected by the third optical device.

In still another embodiment, the first optical device has a function of transmitting light and a function of scattering light, and provides the reference beam with an intensity distribution of a plane wave at a scattering angle.

In still another embodiment, the beat signal corresponds to a frequency difference between the scattered reference beam and the signal beam.

In still another embodiment, the beat signal corresponds to a phase difference between the scattered reference beam and the signal beam.

In the optical heterodyne detection method and the optical heterodyne detecting apparatus according to the present invention, by scattering the reference beam by the first optical device, it is possible to obtain the scattered reference beam necessarily including a component of which wavefront is coincident with that of the signal beam. Accordingly, regardless of the wavefront difference between the two beams, i.e., the signal beam and the reference beam, the beat signal can be stably detected.

Accordingly, since mechanical adjustment for adjusting the angular deviation is not required, an optical heterodyne detecting apparatus capable of efficient detection of beat signal as well as downsizing of apparatus structure is advantageously realized.

In the case of using the diffusing plate as the first optical device, it is possible to obtain the beat signal with sufficient intensity and usable over a wide range of deviation angles.

In the case of using the reflection type diffusing plate as the first optical device, the scattering angle can be made large. In addition, it is possible to prevent the amount of light from decreasing.

In the case of using the multilayer thin lens as the first optical device, the scattering angle is controllable in addition to the solid angle, which is advantageous for receiving the signal beam with directionality.

In the case of using the micromirror array as the first optical device, good reproducibility and control capability are achieved.

In the case of using the diffraction grating as the first optical device, phase distortion is eliminated. Also, the apparatus is easily manufactured.

In the case of using the variable device whereby the direction of the scattered reference beam or the signal beam is made variable, control is performed by the control device on the basis of the beat signal detected by the third optical device. Hence, a wide range of use is achieved with respect to the deviation angle, and it is easy to adjust the scattered reference beam into the signal beam.

In the case where the first optical device has the function of transmitting light and the function of diffusing light, the intensity distribution of the plane wave at a scattering angle is given to the reference beam, and thereby it becomes possible to detect the beat signal.

Thus, the invention described herein makes possible the advantages of (1) providing an optical heterodyne detection method and an optical heterodyne detecting apparatus, regardless of the angular deviation in wavefront between the signal beam and the reference beam, capable of efficiently detecting the beat signal without mechanical adjustment for adjusting the angular deviation, and of downsizing system structure; and (2) providing an optical heterodyne detection method and an optical heterodyne detecting apparatus, even if the angular deviation is large, capable of efficiently detecting the beat signal.

These and other advantages of the present invention will become apparent to those skilled in the art upon reading and understanding the following detailed description with reference to the accompanying figures.

Description of the Preferred Embodiments

EXAMPLE 1

Figure 1:
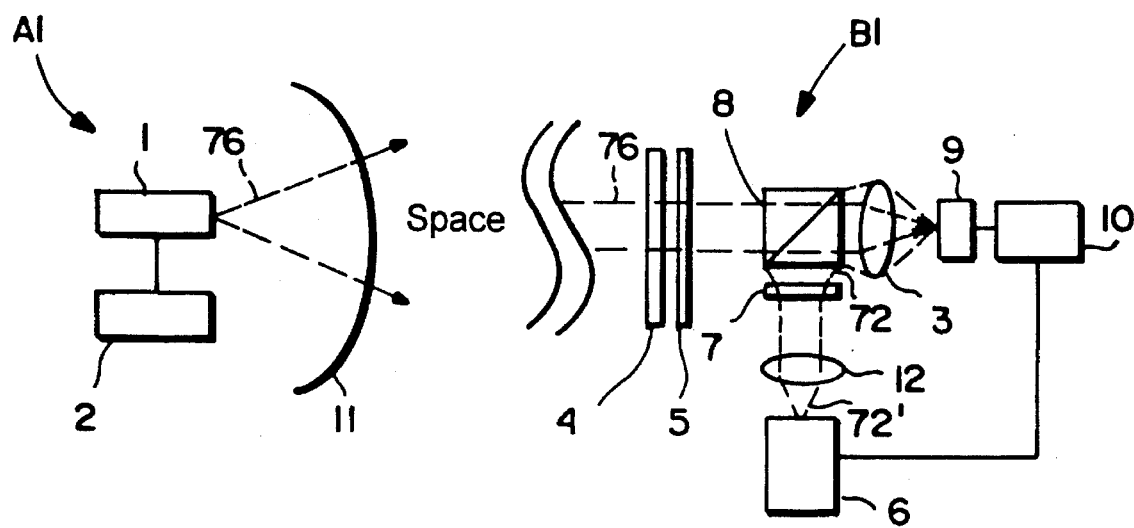
FIG. 1 is a view showing the system construction of an optical heterodyne detecting apparatus applied to a wireless optical communication system, according to a first example of the invention.

FIG. 1 shows Example 1 of the optical heterodyne detecting apparatus according to the present invention. In Example 1, the optical heterodyne detecting apparatus is applied to the wireless optical communication system (spatial optical transmission system), which is composed of a transmitter side A1 and a receiver side B1. The transmitter side A1 and receiver side B1 will be described hereinafter.

The transmitter side A1 has a tunable semiconductor laser 1, a control circuit 2 and a laser beam emission window 11. In order to generate a signal beam 76, the tunable semiconductor laser 1 digitally switches coherent light having the wavelength of $\lambda_0$ (standard wavelength) and coherent light having the wavelength of $\lambda_1$ ($\lambda_0 \neq \lambda_1$). The control circuit 2 monitors an output from the tunable semiconductor laser 1 and controls the emission intensity and the wavelength of the signal beam 76. The signal beam 76 is transmitted to a space through the laser beam emission window 11.

This example uses an Si-based device (being photosensitive only at a wavelength of 900 nm or below) as a light receiving element 9 provided on the later described receiver side B1. The light receiving element 9 electrically detects a beat signal of the signal beam 76 and a reference beam 72, based on the voltage or electric current of the beams. Therefore, an AlGaAs-based semiconductor laser whose wavelength is set to 830 nm is employed as the tunable semiconductor laser 1.

The receiver side B1 has a polarizing filter 4, a filter 5, a reference beam semiconductor laser 6, a collimator lens 12, a diffusing plate 7, an optical device 8, a condenser lens 3, a light receiving element 9 and a signal processing circuit 10.

By the polarizing filter 4, the signal beam 76 transmitted from the transmitter side A1 is converted into linearly polarized light and then is incident on the optical device B. Between the polarizing filter 4 and the optical device 8, the filter 5 is disposed. By this filter 5, the components of background light (ambient light), such as indoor illumination or sunlight, are transmitted only at the frequency of the signal beam 76 (830 nm in this example). Namely, the filter 5 cuts off noise components, and excludes all other frequencies of light.

On the optical device 8, a laser beam is also incident from the reference beam semiconductor laser 6, which emits a coherent light of the reference wavelength which will be a reference beam 72'. Between the optical device 8 and the reference beam semiconductor laser 6, the collimator lens 12 and the diffusing plate 7 are disposed in this order from the side of the reference beam semiconductor laser 6. The collimator lens 12 collimates the reference beam 72' and guides it to the diffusing plate 7. The diffusing plate 7 diffuses the collimated reference beam 72' and guides the scattered reference beam 72 to the optical device 8. Example 1 uses a frosted glass as the diffusing plate 7.

The optical device 8, made of prisms, superimposes and mixes the signal beam 76 and the scattered reference beam 72. The superimposed and mixed light is condensed by the condenser lens 3 and guided to the light receiving element 9. By the light receiving element 9, a beat signal as an electric signal is detected from the mixed light of signal beam 76 and scattered reference beam 72. The signal detected by the light receiving element 9 is input to the signal processing circuit 10, and therein is subject to amplification, waveform shaping processing and demodulation processing. In this way, the communication between the transmitter side A1 and the receiver side B1 is accomplished.

As described above, by providing the condenser lens 3 and thereby condensing the mixed light and guiding it to the light receiving element 9, it is possible to make the light receiving element 9 smaller. Further, the response speed is improved without reducing the intensity of the mixed light.

Figure 2:
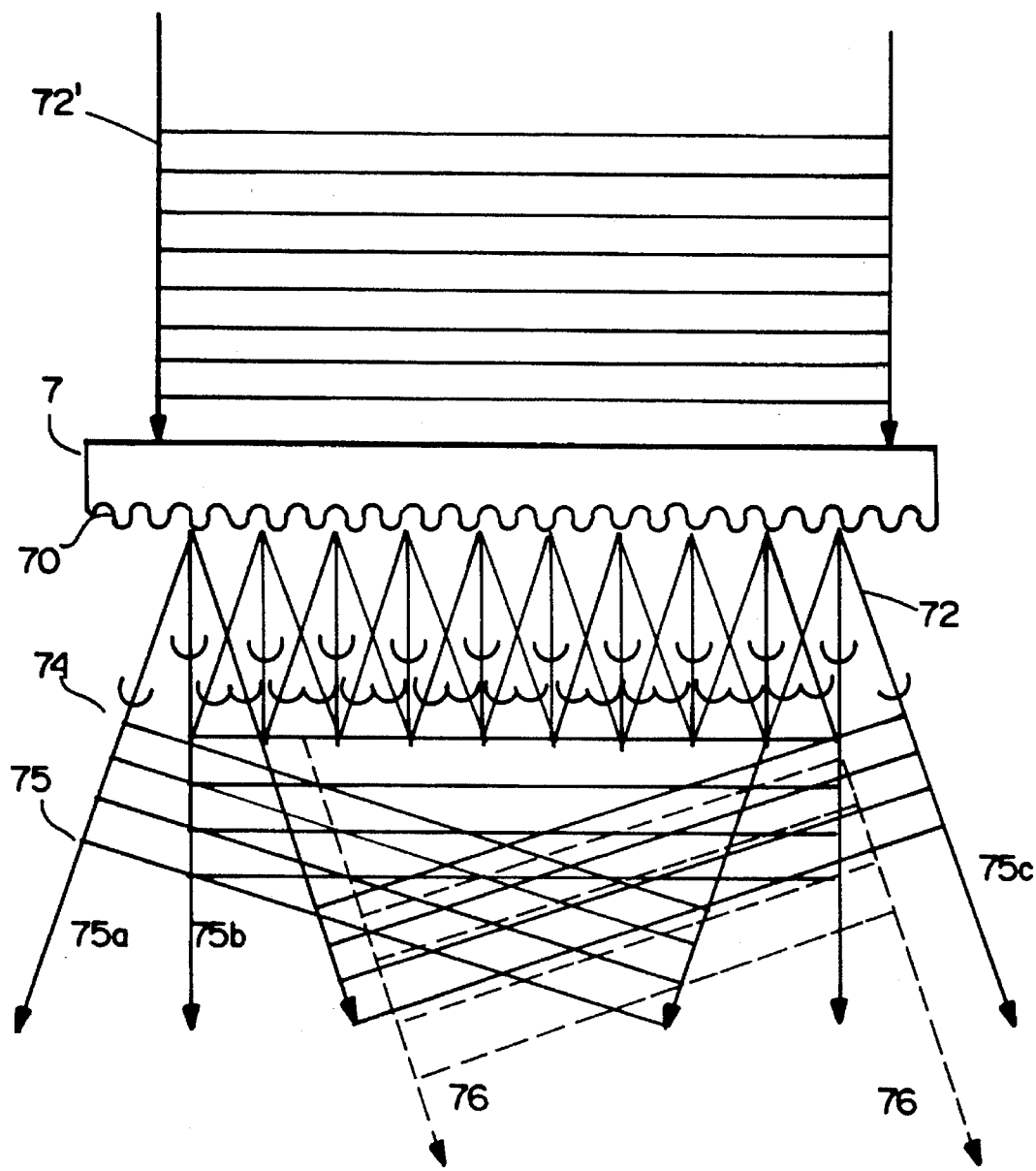
FIG. 2 is an explanatory view showing the principle of the beat signal detection performed by the optical heterodyne detecting apparatus according to the invention.

The principle of beat signal detection according to the present invention will be described hereinafter, with reference to FIG. 2. An outgoing face of the diffusing plate 7 is made a scattering plane 70 on which concavities and convexities are formed. By passing through the scattering plane 70, the reference beam 72' (plane wave) becomes the scattered reference beam 72, which is a collection of spherical waves 74 dispersing in various directions. This collection can be viewed as a collection of plane waves 75 in various directions. FIG. 2 shows only the plane waves of three directions, 75a, 75b and 75c among the plane waves.

On the other hand, in the case of spatial optical transmittance, the incident angle of the signal beam 76 is not fixed to one specific angle. That is, the signal beam 76 is incident at various angles. If the incident angle is smaller than the scattering angle of the reference beam 72', the scattered reference beam 72 necessarily includes a component 75c whose wavefront is coincident with that of the signal beam 76. However, the optical device 8 for mixing the scattered reference beam 72 and the signal beam 76 is not shown in FIG. 2.

As described in connection with prior arts, if the wavefront of the scattered reference beam 72 (i.e., the component 75c) and that of the signal beam 76 are aligned, it is possible to detect the beat signal of two respective light rays, the signal beam 76 and the reference beam 72'.

As for the deviation angle β between the signal beam 76 and the reference beam 72', the beat signal detection permissible range of the deviation angle δ is determined depending on the scattering angle of the diffusing plate 7. The scattering angle can be controlled by changing the spatial pitch of the concave and convex pattern of the scattering plane 70. In general, when the scattering angle is large, the intensity of scattered plane wave 75 in each direction is reduced. Since the reference beam 72', which is not emitted out of the apparatus, has no effect on the human body, the intensity thereof can be intensified sufficiently high. Accordingly, the reduction in the intensity of the scattered plane wave 75 can be easily compensated by making the intensity of reference beam 72' sufficiently high. Therefore, according to the present invention, the beat signal which is sufficiently intense and usable for a wide range of deviation angle δ is obtained by scattering the reference beam 72' with the use of the diffusing plate 7.

Therefore, according to the present invention, regardless of the deviation of angle between the signal beam 76 and the reference beam 72', the beat signal can be detected precisely and quickly. Further, unlike the above-mentioned spatial tracking system, the system construction can be downsized since the mechanical adjustment with respect to the deviation angle is not required.

Figure 3A:
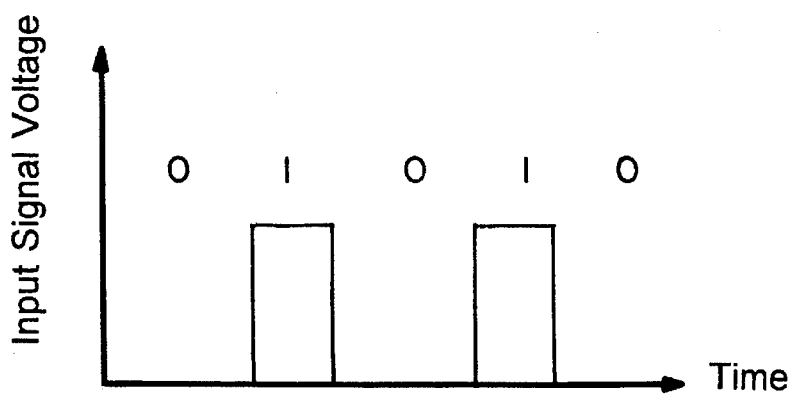
FIGS. 3A to 3D are waveform views showing a signal waveform at respective stages of the wireless optical communication system.
Figure 3B:
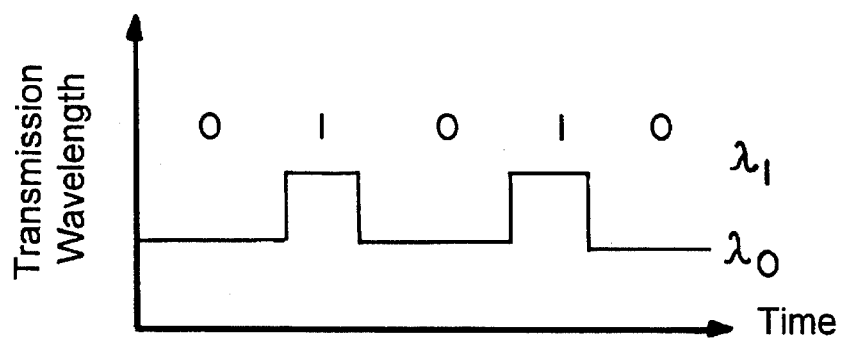

Next, the principle of transmission from the transmitter side A1 to the receiver side B1 will be described with reference to FIGS. 3A to 3D. FIG. 3A shows the waveform of a digital signal to be transmitted. In correspondence with this digital signal, on the transmitter side A1, two wavelengths $\lambda_0$ and $\lambda_1$ are controlled by the control circuit 2 and modulated by the tunable semiconductor laser 1. In this way, the signal beam 76 having the waveform as shown in FIG. 3B is emitted to the space. The light with its wavelength (frequency) thus modulated propagates through the space, is mixed with the scattered reference beam 72 (wavelength $\lambda_0$) from the reference beam semiconductor laser 6, and is converted into the electric signal by the light receiving element 9.

Figure 3C:
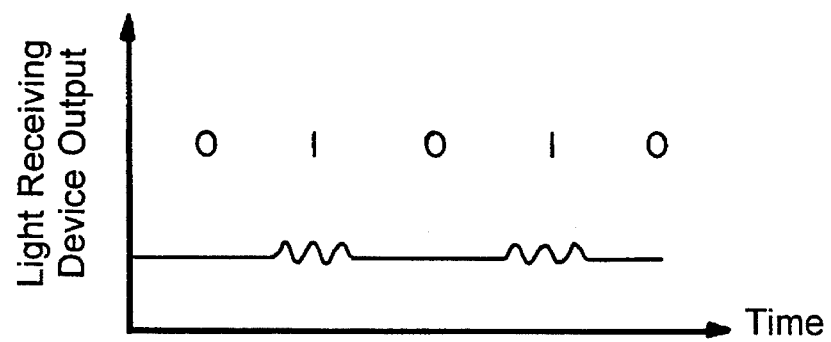
Figure 3D:
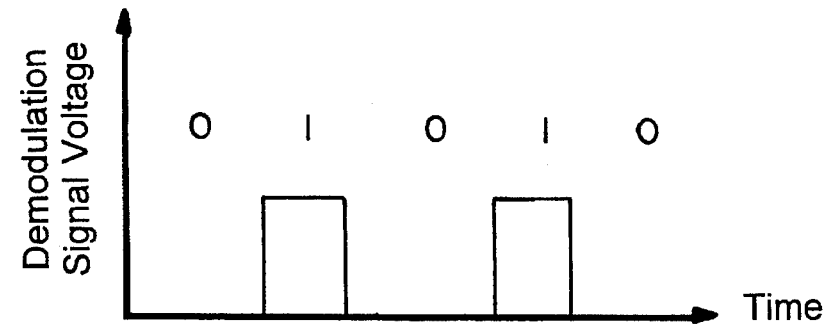

FIG. 3C shows the waveform of this electric signal. As made clear by comparing this figure with FIG. 3A, the beat signal (frequency $\Delta v=v_1-v_2$) appears when an original digital signal is "1". This beat signal is demodulated by the signal processing in the above signal processing circuit 10, and the original digital signal is obtained on the receiver side B1 (see FIG. 3D). In this way, the communication between the transmitter side A1 and the receiver side B1 is accomplished.

Figure 4:
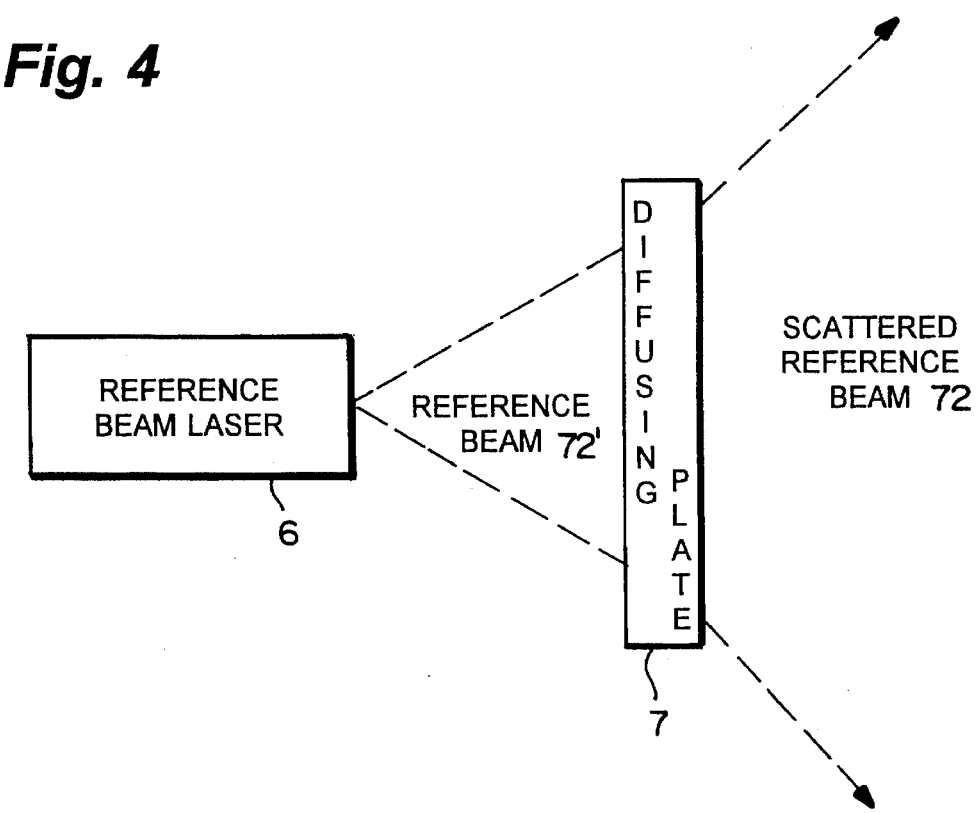
FIG. 4 is a schematic view showing a variation of the first example.

Since in Example 1 the phase shift between the signal beam 76 and the scattered reference beam 72 is permissible to some extent, a variation shown in FIG. 4 is possible. In this variation, in place of providing the collimator lens 12, the reference beam 72' is directly scattered by the diffusing plate 7. This variation is advantageous in that the number of parts can be reduced since the optical system for collimation is unnecessary. Also, it is possible to use the reference beam 72' without loss. Further, the scattering angle can be made larger directly from the spread image of laser beam in a far field.

Such a wireless optical communication system is applied to a local area network (LAN) or the like. It is practically impossible to align an outgoing port of the transmitter side and an incident port of the receiver side without any angular deviation, in accordance with the movement of the transmitter side A1 or the receiver side B1 and the like. However, by using a diffusing plane as in Example 1, i.e., by the method to be called a diffusing wavefront alignment method or the like, a wireless optical communication system which is mobile and requires no angular adjustment is realized.

EXAMPLE 2

Figure 5:
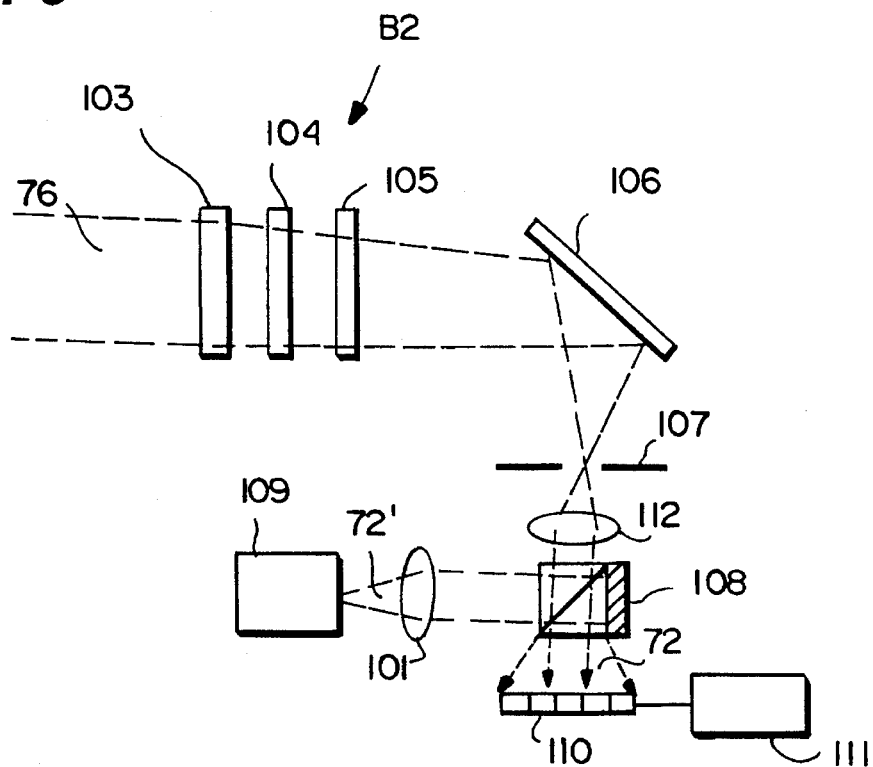
FIG. 5 is a view showing the system construction of an optical heterodyne detecting apparatus applied to a wireless optical communication system, according to a second example of the invention.

FIG. 5 shows Example 2 of the heterodyne detecting apparatus according to the present invention. In Example 2, similarly to Example 1, the optical heterodyne detecting apparatus is applied to the wireless optical communication system. Also, a wireless optical communication system using a heterodyne detecting apparatus similar to this Example 2 was formerly proposed by the inventors of this invention as "A spatial optical transmission apparatus and the transmission method using the same", disclosed in Japanese Patent Application No. 4-212648.

The signal modulation method of Example 2 differs from that of Example 1 in that the signal is transmitted not as a change in the frequency of light but as a change in the phase of light. This method will be described in detail hereinafter.

The signal beam 76 generated from the semiconductor laser on the transmitter side is subject to phase modulation by an electrio optical modulation device (not shown) and is transmitted to the receiver side B2. The construction of the receiver side B2 will be described together with the operation thereof.

The signal beam 76 propagating through the space is condensed by a hologram lens 103. Then the condensed signal beam 76 is converted into circularly polarized light by a λ/4 plate 104 and guided to a polarizing plate 105. Selectively from the circularly polarized light, the polarizing plate 105 transmits a linearly polarized light component having the same polarizing direction as the reference beam mixed at the time of light reception. The signal beam 76 subject to the linearly polarized light conversion by the polarizing plate 105 is diffracted by a reflection type diffraction grating 106. Following this, a specific wavelength corresponding to the wavelength of the signal beam 76 is extracted by a pinhole 107 set at the focal point of the hologram lens 103. Then, the signal beam 76 only of the extracted wavelength component is collimated by a collimator lens 112 and is incident on a light receiving array 110 including a plurality of light receiving elements arranged in a matrix form. The beam is incident on one of the light receiving elements. In this way, the component having a wavelength different from that of the signal beam 76 is removed from the incoherent light which is scattered by the hologram lens 103 and mixed with the signal beam 76.

Similarly to the above example, the reference beam 72' is generated from a reference beam semiconductor laser 109. The reference beam 72' is collimated by a condenser lens 101, and then reflected and diffused by a reflection type diffusing plate 108, and is incident on the light receiving array 110 as the scattered reference beam 72. Accordingly, in Example 2, the signal beam 76 extracted as described above and the scattered reference beam 72 are subject to the optical heterodyne detection by the light receiving array 110. A beat signal which has been subject to the optical heterodyne detection is demodulated via signal processing by a signal processing circuit 111 similar to the above-mentioned signal processing circuit.

Here, the scattered reference beam 72 scattered by the reflection type diffusing plate 108 can be viewed as a collection of plane waves having a component in the direction of one specific solid angle. Therefore, according to Example 2, even if the signal beam 76 is diagonally incident, it is possible to generate the beat signal by using the interference of the signal beam 76 and certain part of plane waves of the reflected and scattered reference beam 72.

In Example 2, an aluminum plate polished with Sand #1500 is employed as the reflection type diffusing plate 108. In the case of using such a polished metal plate as the reflection type diffusing plate 108, the scattering angle can be made larger than in the case of the transmission type scattering plate 7 of Example 1. In addition, it has an advantage that the light amount attenuation by backwardly scattering of the reference beam 72' does not occur, unlike the transmission type diffusing plate 7.

Also, Example 2 employs a two-dimensional array of PIN photodiodes made of Ge semiconductor as the light receiving array 110 of light receiving elements. As described in the foregoing, the scattered reference beam 72 generated from the reference beam semiconductor laser 109 and scattered by the reflection type diffusing plate 108 is mixed with the signal beam 76 and is incident on this array 110 of light receiving elements. This array 110 of light receiving elements squares and detects the incident light to obtain an output expressed by the aforementioned Formula 3. then, the signal processing circuit 111 demodulates this output into the original signal transmitted from the transmitter side.

In optical heterodyne detection using the above array 110 of light receiving elements, the signal beam 76 entering from a different direction is incident on a different light receiving element, and the beat signal is detected therein. Accordingly, by arranging the light receiving elements as an array, it becomes possible to select one light receiving element in which maximum beat signal is detected, correspondingly to the incident direction of the signal beam 76. It is also possible to detect the incident angle of the signal beam 76 itself. Accordingly, in a wireless optical communication system and the like, even if the signal beam 76 follows multiple paths because of reflection by a wall or the like and arrives late, the reflected signal beam is not taken in. This assures reliable removal of the noise caused by the reflected signal beam and contributes to the improvement of detection accuracy.

Example 2 makes it possible similarly to Example 1 to perform optical transmission without angle adjustment between the transmitter side and the light receiver side.

As is apparent from the description of Examples 1 and 2, the distinctive feature of this invention is to scatter the reference beam and thereby generate the collection of plane waves (the scattered reference beam) having a certain solid angle necessarily including a scattering component whose wavefront aligns with that of the signal beam. That is, it is made possible to detect the beat signal without wavefront alignment operation between the signal beam and the reference beam.

In the following Examples 3 to 8, the description will be directed only to the means for generating from the reference beam the collection of plane waves having a certain solid angle. The explanation of the system as a whole will be omitted.

EXAMPLE 3

Figure 6:
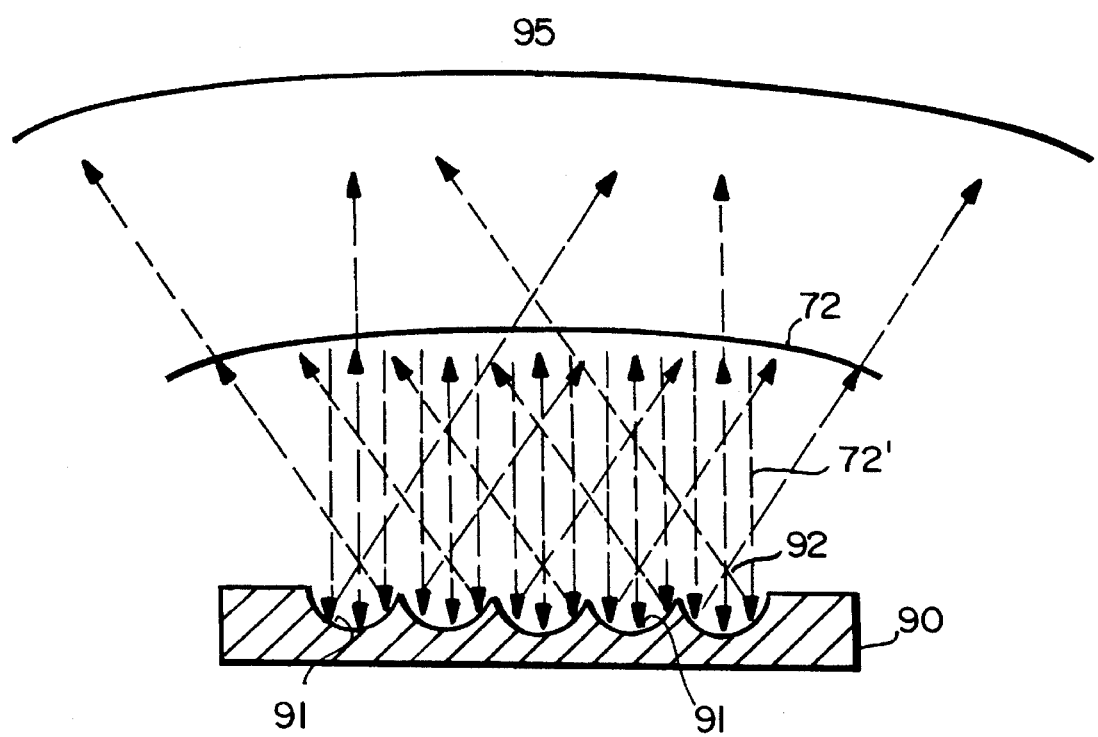
FIG. 6 is a schematic side view showing a main section of an optical heterodyne detecting apparatus according to a third example of the invention.

FIG. 6 shows Example 3 of the present invention, wherein in place of the relection type diffusing plate 108 made of aluminum in Example 2, a micromirror array 90 on the surface of which a large number of concave spherical shaped mirrors (micromirrors) 91 are disposed is used as the diffusing plate. As shown in FIG. 6, reflected by the mirror surface of the micromirror array 90, the reference beam 72' becomes the scattered reference beam 72 scattering in various directions. In order to efficiently detect the beat signal, it is required that a beam area 95 of the scattered reference beam 72 is as large as the beam area of the signal beam. It is desirable that individual mirrors of the micromirror array 90 are sufficiently smaller than these beam areas.

In Example 3, it is possible to design the micromirror so as to precisely control the wavefront. The reason for this will be described below. The plane wave incident on each of the mirrors 91 is reflected thereby, and the image of the plane waves is formed on a focal plane 92. This image is equivalent to an array of spherical wave light sources arranged on the focal plane 92 at a pitch equal to that of the micromirror array 90. The spread angle of the light sources depends on the design of the mirror 91.

On the other hand, a far field image formed by the array of the spherical wave light sources has an intensity distribution as shown in Formula 6, where w stands for the width of beam, c for the pitch between the mirrors 91, $\lambda$ for the wavelength, and x for the angle of deviation from the incident direction of the plane wave:

$$|\sin(w\pi x/\lambda)/\sin(\pi c x/\lambda)| \quad \text{Formula 6}$$

Figure 7:
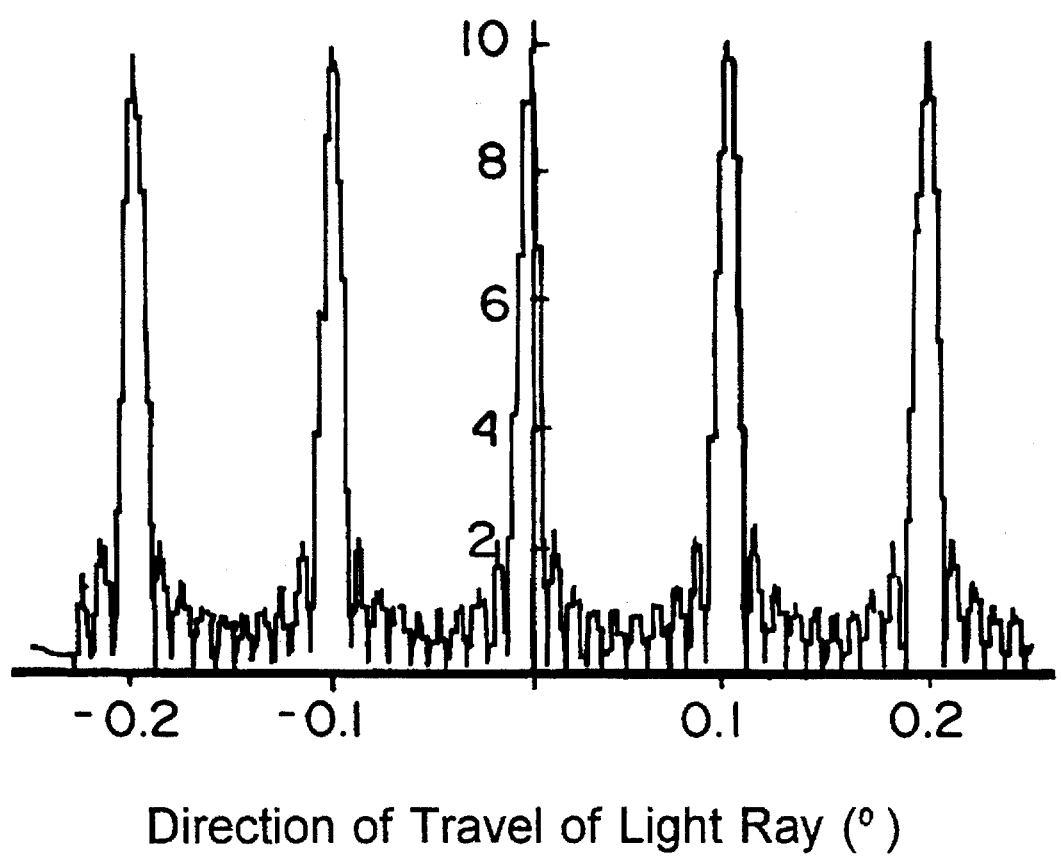
FIG. 7 is a graph showing the behavior of a far field image. The vertical axis represents an electric field intensity, and the horizontal axis represents the direction (degree) of travel of a light ray.

For example, when w=4.5 mm, c=450 μm and $\lambda$=780 nm, a far field image whose intensity distribution decided by the above Formula 6 becomes as shown in FIG. 7. As apparent from FIG. 7, the far field image forms the pattern of plane waves repeated at about 0.1 degree intervals in the traveling direction. According to the above Formula 6, the plane wave is repeated at intervals of angle which satisfies $cx/\lambda = n$ (n is an integer). Accordingly, in order that the repeat angle be equal to or below X degree, the following relation is required:

$$c \geq 180 \, \lambda/\pi/X \quad \text{Formula 7}$$

Figure 17:
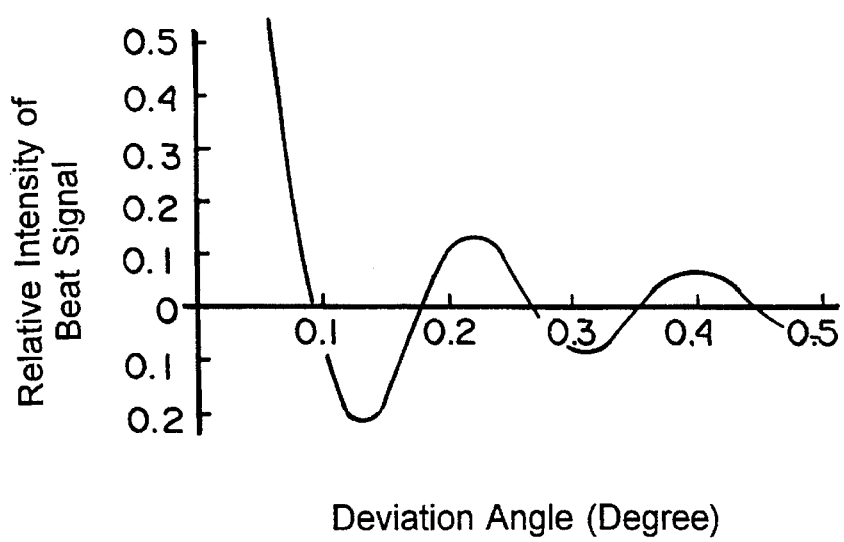
FIG. 17 is a graph showing the relationship between the deviation angle of the two optical fluxes and the relative intensity of the beat signal.
Figure 18:
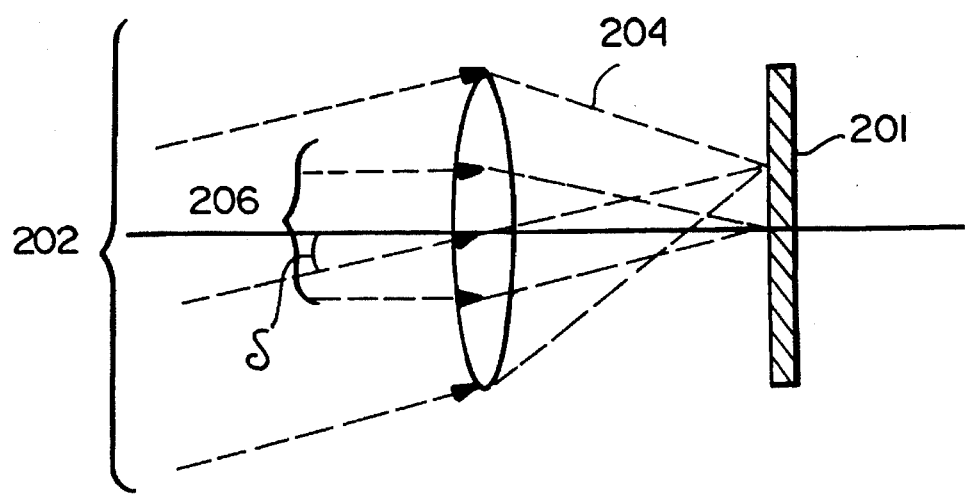
FIG. 18 is a schematic view showing a conventional optical heterodyne detection method applied to the spatial tracking system.
Figure 19:
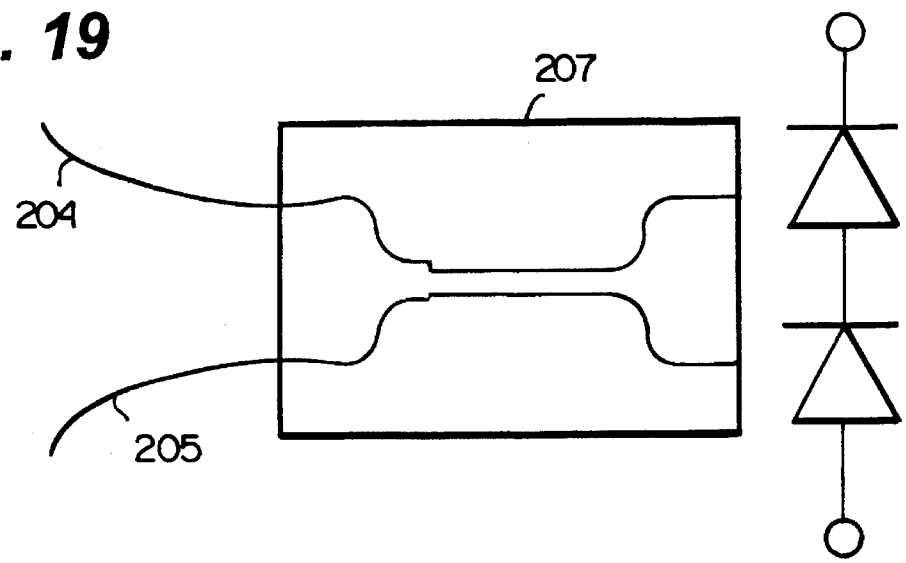
FIG. 19 is a schematic view showing a conventional optical heterodyne detection method using an optical coupler.

As already described with reference to FIG. 17, in the case of the size of light receiving section being 500 μm, the beat signal cannot be detected due to the angular deviation of 0.1 degree. Therefore, in order to detect the beat signal, it is required to repeat the plane wave at angular intervals less than 0.1 degree. Namely, when the repeat angle is equal to or less than 0.1 degree with respect to the oscillation wavelength $\lambda$, the condition $c \geq 573 \, \lambda$ is obtained from the above Formula 7. Naturally, this relationship changes depending on the size of the light receiving section. A concave mirror array is used in this example, but a convex mirror array is also usable.

In comparison with Examples 1 and 2, in Example 3, it is advantageous that the optical heterodyne detection can be improved in reproductivity and control performance.

EXAMPLE 4

Figure 8A:
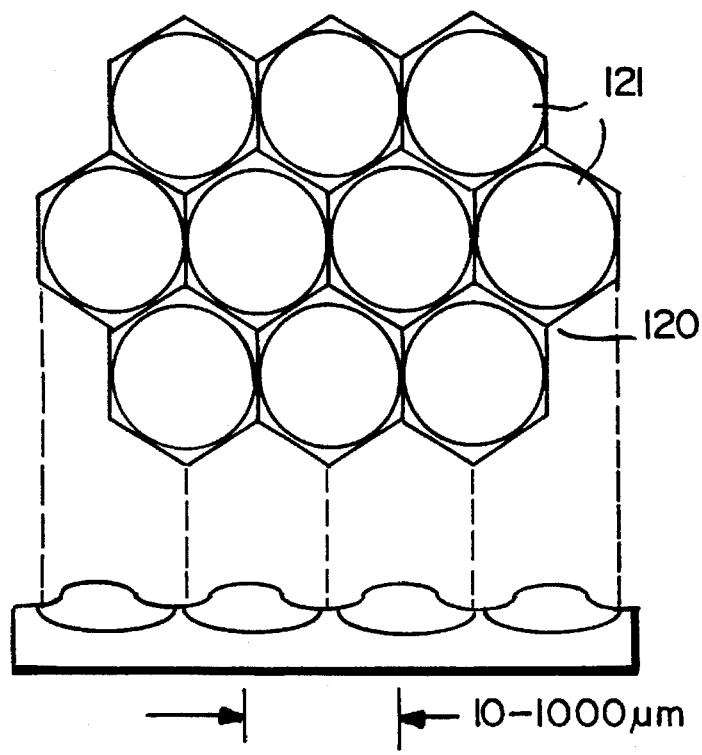
FIG. 8A is a schematic plan view showing a main section of an optical heterodyne detecting apparatus according to a fourth example of the invention.
Figure 8B:
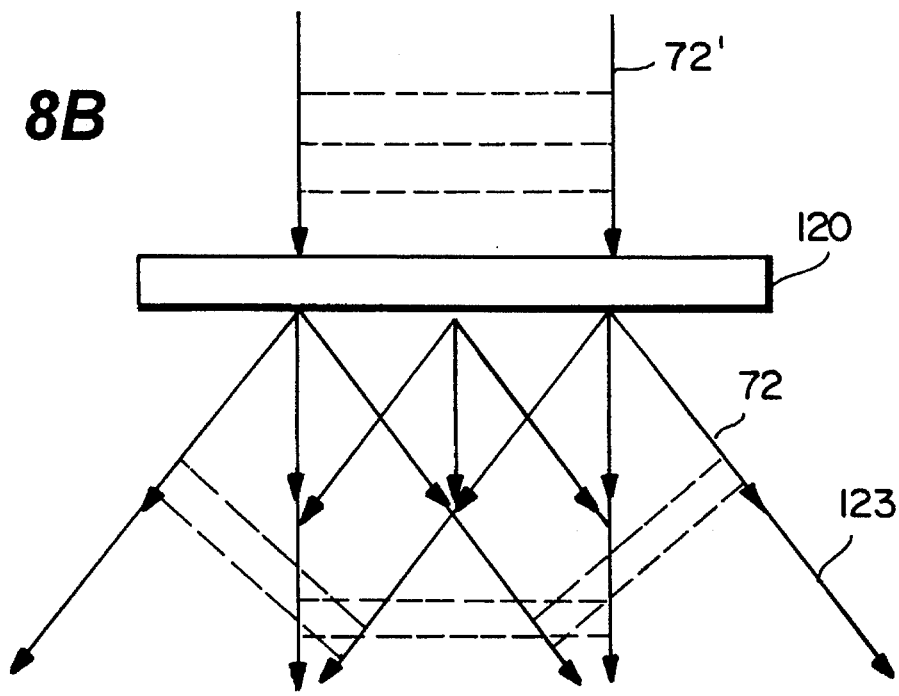
FIG. 8B is a schematic side view showing a main section of the optical heterodyne detecting apparatus according to the fourth example of the invention.

FIGS. 8A and 8B show Example 4 of the present invention. In Example 4, a microlens array 120, e.g., described in "M. Oikawa and K. Iga, Applied Optics 21(6), 1982, p. 1052" is employed as a transmission type diffusing plate used as a means for generating the scattered reference beam 72.

FIG. 8A shows the concept of the microlens array 120, which is constructed by arranging a large number of hexagonal microlenses 121 so that the peripheral edge of one hexagon is continuously overlapped with that of another hexagon.

FIG. 8B shows how the light ray is scattered by the microlens array 120. The reference beam 72' incident on the microlens array 120 is scattered to be the scattered reference beam 72 in various directions, i.e., the collection 123 of plane waves in various directions. Accordingly, the same effects as each of the above examples can be obtained by Example 4.

In addition, since the microlenses 121 are used in the generation of the scattered reference beam 72, it is possible to eliminate the phase turbulence.

Similarly to Example 3 above, in Example 4, after passing through the microlens 121, the light forms images on the plane (not shown) apart from the microlens 121 by the focal length thereof and then equivalently becomes a spherical wave array. The extent to which the spherical wave extends depends on the opening of each of the microlenses 121. In other words, by changing conditions of the lens, such as a pitch, opening, focal length and diameter, it becomes possible to detect the beat signal over the desired range of angle. A concave lens array is used in this example, but a convex lens array is also usable.

EXAMPLE 5

Figure 9:
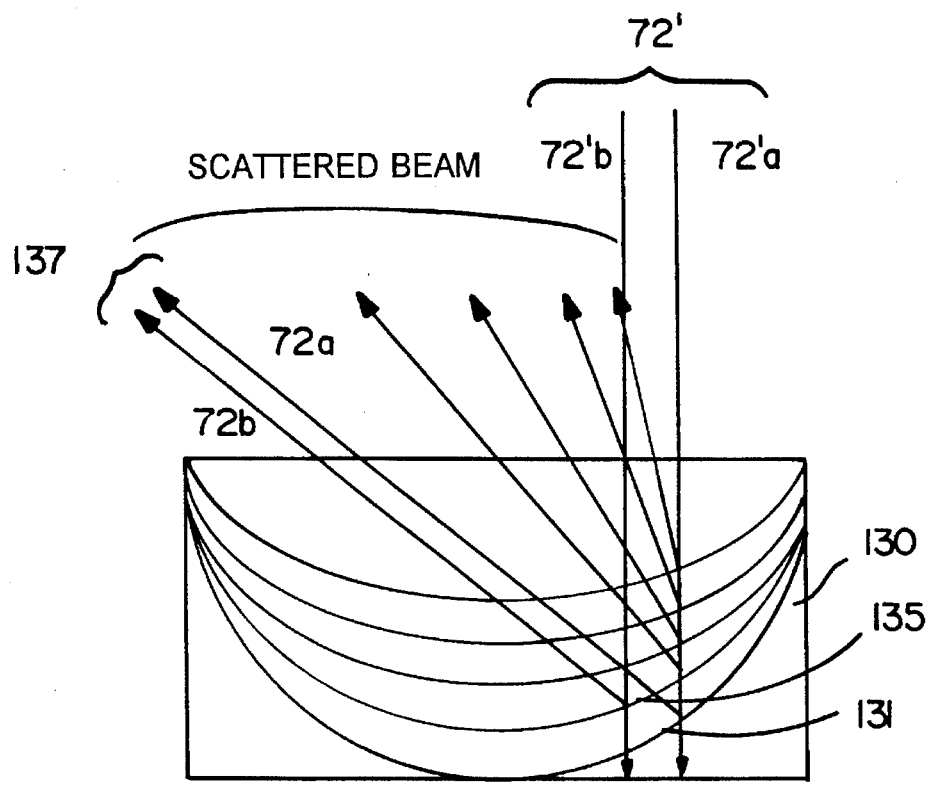
FIG. 9 is a schematic side view showing a main section of an optical heterodyne detecting apparatus according to a fifth example of the invention.

FIG. 9 shows Example 5 of the present invention. Example 5 employs a multilayer thin film lens 130 for generating the scattered reference beam 72. This multilayer thin film lens 130 is composed of a plurality of thin film lenses layered one after another, and individually having a different refractive index. The reference beam 72' is scattered by the reflection at respective field planes between two adjacent layers of film lens 130. The reference beam 72' includes a component 72'a and a component 72'b. The component 72'a is reflected by a thin film layer 131 and becomes a scattered reference beam 72a. Similarly, the component 72'b being in the same phase as the component 72'a is reflected by a thin film layer 135 and becomes a scattered reference beam 72b. The scattered reference beam 72a together with the scattered reference beam 72b forms part of a plane wave 137.

In such a construction, the collection of plans waves spreading in continuous directions can be obtained by sufficiently increasing the number of thin film layers. Accordingly, the same effects as each of the above examples can be obtained by Example 5.

Further, Example 5 is advantageous in receiving the signal beam having a directionality, since the scattering direction can be controlled in addition to the solid angle.

EXAMPLE 6

Figure 10:
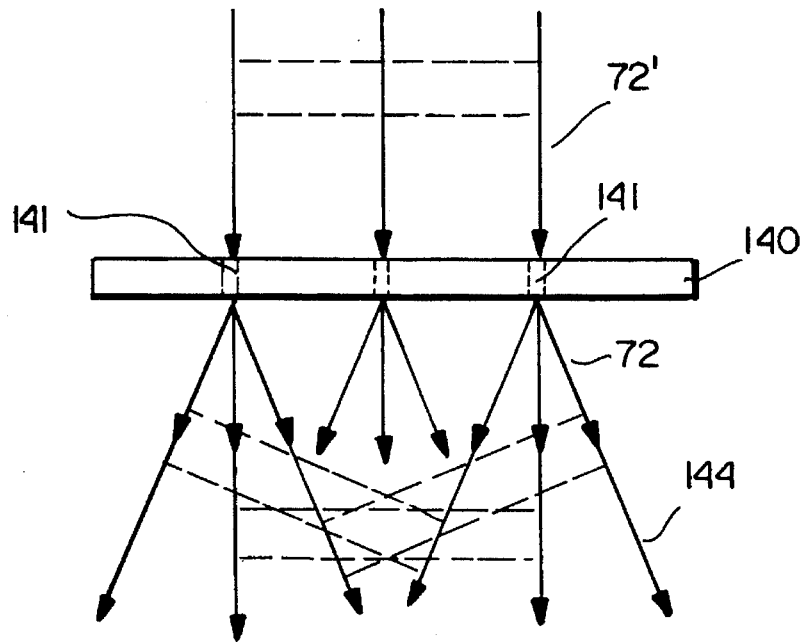
FIG. 10 is a schematic side view showing a main section of an optical heterodyne detecting apparatus according to a sixth example of the invention.

FIG. 10 shows Example 6 of the present invention, utilizing diffraction of light for generating the scattered reference beam 72. The diffraction is caused by a plate-shaped object (diffraction plate) 140 made of a material which does not transmit light. A large number of penetrations 141 are provided on the diffraction plate 140 as shown in FIG. 10.

The reference beams 72' incident on the diffraction plate 140 are diffracted by the penetrations 141. The scattered reference beams 72, i.e., the diffracted reference beams 72' form the collection 144 of plane waves.

Unlike Examples 3 and 4, in the case of using a diffraction means as in Example 6, the scattered light can not be viewed as the array of light sources of spherical waves. However, the far field image formed by the scattered light can be controlled by the pitch and the size of the penetrations 141 provided on the diffraction plate 140. The intensity distribution thereof is given by the below Formula 8 where a stands for the diameter of the penetration 141 and the outer symbols are identical to those in Formula 6 above:

$$|\sin(a\pi x/\lambda)/(a\pi x/\lambda) \cdot \sin(w\pi x/\lambda)/(\pi c x/\lambda)|  \quad \text{Formula 8}$$

As is apparent from this Formula 8, the amplitude as a whole is restricted by $\sin(a\pi x/\lambda)/(a\pi x/\lambda)$. For example, in order to realize the spread angle of light source $\geq 10$ degrees, it is sufficient to make a $\leq 5.73\lambda$.

A publication related, to Example 6 is, for example, "Optical Electronics" by Jiro Koyama and Hiroshi Nishihara, published by Corona Publishing Co., Ltd.

In addition, the turbulence of phase is eliminated and the scattered reference beam is easily generated in Example 6, since the scattered reference beam 72 is produced by using the diffraction phenomenon.

In each of the above examples, various scattered light generating means such as a planar scattering plate, lens, mirror and a diffraction plate are described. Naturally, the variants and modifications of such means are also included within the scope of the present invention.

EXAMPLE 7

Example 7 of the present invention will be described hereinafter. In this Example 7, a SELFOC lens array is employed in place of the microlens array in Example 4 above. It is difficult to make the pitch between lenses more than 400 μm in Example 4. However, in Example 7, it is relatively easy to realize such a spacing. Additionally, it is possible to design a lens aberration to be small.

EXAMPLE 8

Figure 11A:
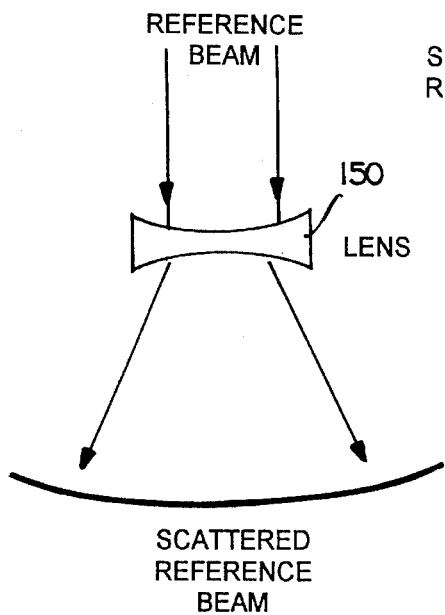
FIGS. 11A to 11D are schematic side views each showing a main section of an optical heterodyne detecting apparatus according to a seventh example of the invention.
Figure 11B:
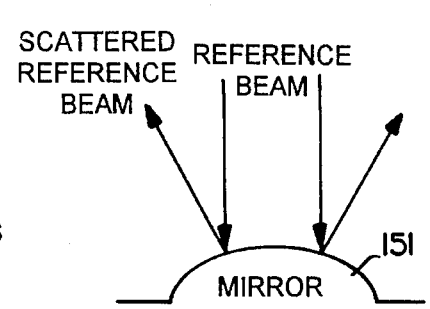
Figure 11C:
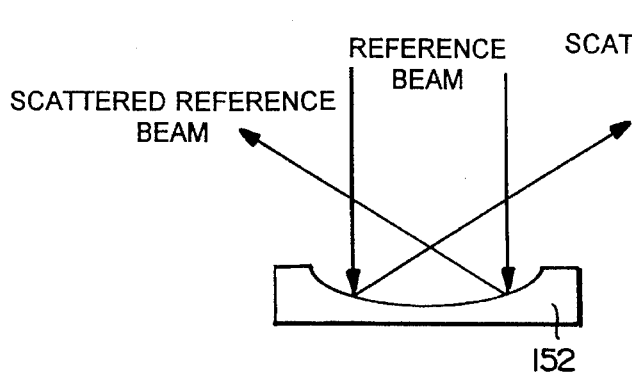
Figure 11D:
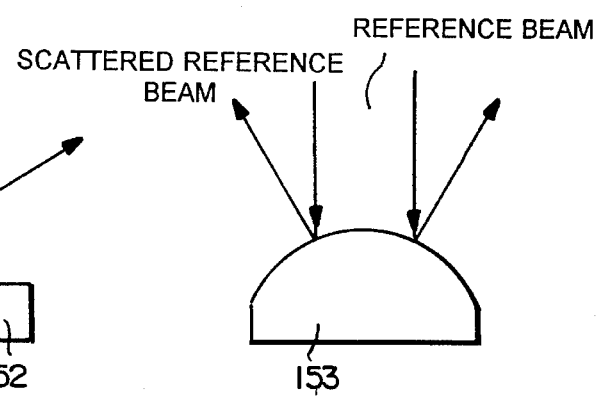

FIGS. 11A to 11D show Example 8 of the present invention. In this example, one lens or one mirror is used for easily obtaining a scattered reference beam. FIG. 11A shows an example using a concave lens 150, FIG. 11B shows an example using a convex mirror 151, FIG. 11C shows an example using a concave mirror 152, and FIG. 11D shows an example using a convex-shaped collection (polygon mirror) 153 composed of a plurality of plane mirrors.

It is also possible to use a convex lens in Example 8.

EXAMPLE 9

Figure 12:
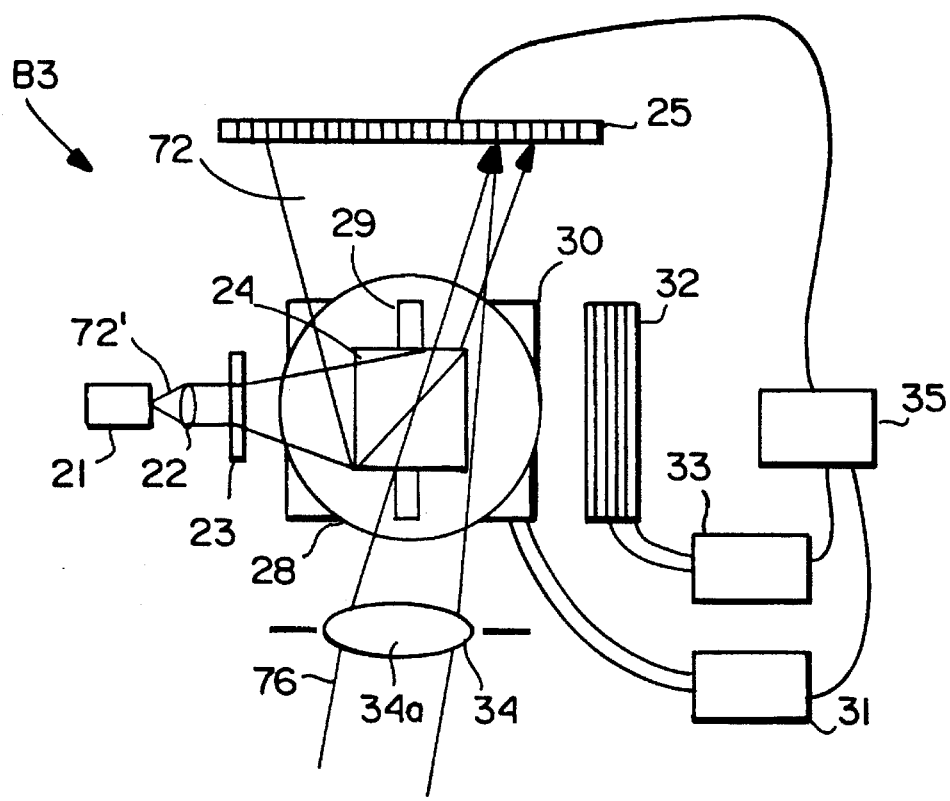
FIG. 12 is a view showing the system construction of an optical heterodyne detecting apparatus applied to a wireless optical communication system, according to a ninth example of the invention.

FIG. 12 shows Example 9 of the present invention. Also in this Example 9, the optical heterodyne detecting apparatus is applied to the wireless optical communication system.

In the method of using the scattering plans waves as a reference beam as shown in Examples 1 to 8, it is not required to adjust the direction of the reference beam into the signal beam with an accuracy of 0.1 degree or less. However, in order to detect the beat signal over a wide range of angles, it is required that the numeral aperture of the optical device for scattering use such as a lens array be larger and that the repeat angle of far field image be 0.1 degree or less. However, the electric field intensity of the plane wave in each direction is decreased by making the opening larger and the repeat angle smaller, and as a result the intensity of the beat signal is reduced. For avoiding this reduction, the optical heterodyne detecting apparatus of the present invention is provided with an actuating portion, so that the range of the repeat angle of the scatting plane wave is kept sufficiently small, at the same time with restricting the range of repetition occurrences. The light intensity required for beat signal detection is thus ensured by this actuating portion.

In Example 9, the signal beam 76 transmitted from the transmitter side is received at the receiver side B3. The construction and operation of the receiver side B3 will be both explained hereinafter.

On the receiver side B3, the signal beam 76 propagating through a space is incident on the incident window 34 provided with a condenser lens 34a. This beam is condensed on a light receiving array 25 via an optical device for composite light wave 24 (hereinafter referred to as "the optical device 24"). Specifically, the light receiving array 25 includes a plurality of light receiving elements arranged in a matrix form. The beam is condensed on one of the light receiving elements.

The reference beam 72' is generated by the semiconductor laser 21 and is collimated by a collimator lens 22. The collimated reference beam 72' is incident on an optical device for diffusion 23 (this will be referred to as "the optical device 23") and then diffused to be the scattered reference beam 72. After the traveling direction of the scattered reference beam 72 is changed by the optical device 24, the scattered reference beam 72 is combined with the signal beam 76 and then is incident on the light receiving array 25. In this example, an AlGaAs-based 830 nm oscillation wavelength semiconductor laser is used as the semiconductor laser 21, and a SELFOC lens array is used as the optical device 23. The SELFOC lens array is composed of SELFOC lenses each having a diameter of 1 mm which are arranged in a honey-comb pattern. The lenses are arranged at a pitch of 1 mm, and the numeral aperture is made 0.2.

The actuating portion will be described hereinafter. The actuating portion has a rotation stage 28, coils 30 and 32 for generating magnetic fields, power sources 31 and 33 connected to the coils 30 and 32 respectively, and a control circuit 35 provided in the actuating portion for controlling the power sources 31 and 33. The optical device 24 is attached to the rotation stage 28 which is provided with a magnet 29.

The rotation stage 28 is secured with a resin-like soft bond to a rod (not shown) in its center portion. The coil 30 generates a magnetic field in the vertical direction with respect to the paper surface of FIG. 12. The coil 32 generates a magnetic field in the lateral direction with respect to the paper surface. The rotation stage 28 and the optical device 24 are rendered rotatable by the interaction between these magnetic fields and the magnet 29 provided on the rotation stage 28. The control circuit 35 optimizes an electric current passing through the power sources 31 and 33 so as to process the signal detected by the light receiving array 25 and to rotate the rotation stage 28 at a desired rotation angle.

In the case of Example 9, by means of the optical device 23, the plane wave components of the scattered reference beam 72 occur on the light receiving array 25, at a pitch of 0.05 degree. The angular range of the existence of the components is ±11.5 degrees. Accordingly, if the angle deviation of the incident direction when signal beam 76 being incident on the light receiving array 25 is within ±11.5 degrees, as described in the foregoing, it is possible to detect the beat signal from the scattered reference beam 72.

On the other hand, in the case where the incident direction of the signal beam 76 deviates at more than ±11.5 degrees, the beat signal is not detected by the light receiving array 25. In such a case, the control circuit 35 controls the power sources 31 and 33 for the adjustment of an electric current to be supplied to the coils 30 and 32. Thus the optical device 24 is rotated, and thereby the beat signal is detected.

The optical heterodyne detecting apparatus of Example 9 uses the scattered reference beam 72. Therefore, the actuating position alignment angle should be accurately set only to the extent of the angle range of existing plane wave components of the scattered reference beam 72, i.e., approximately ±11.5 degrees. Accordingly, unlike the conventional system of wavefront alignment, the wavefront alignment of the signal light and the reference beam can be accomplished in a short time period. Further, the requirement for the positional accuracy of the apparatus is not so strict.

EXAMPLE 10

In Example 10, the optical heterodyne detecting apparatus as shown in FIG. 12 uses a microlens array as the optical device 23. In this microlens array, whose arrangement is shown in FIG. 8A in Example 4, the pitch between lenses in 250 μm, and the numeral aperture of the lenses is 0.4. The microlens array changes all of the incident light into a scattering plane wave, which is used as a scattered reference beam. The scattered reference beam 72 is made to be plane waves repeated by an angle of 0.2 degrees over a range of ±23.6 degrees. The size of the light receiving element is 500 μm in diameter.

Since the scattered reference beam 72 is made up of the plane waves repeated by an angle of 0.2 degree, only by rotating the optical device 24 over an angular range of ±0.1 degree, the beat signal detection becomes possible over the whole range of ±23.6 degrees of the angle deviation between the signal beam 76 and the scattered reference beam 72. Namely, by the optical heterodyne detecting apparatus of the present invention, even a large angle deviation between the signal beam 76 and the scattered reference beam 72 can be processed regardless of the extremely small angular range of the positional alignment performed by the actuating portion.

EXAMPLE 11

An optical heterodyne detecting apparatus according to Example 11 of the present invention will be described with reference to FIG. 13. In this example, the signal beam 76 from the transmitter side is transmitted to a receiver side B4. The configuration and operation of the receiver side B4 will be described hereinafter.

On the receiver side B4, the direction of the signal beam 76 propagating through a space is changed by the optical device 24. Thereafter, the signal beam 76 is incident on a light receiving element included in the light receiving array 25.

On the other hand, the reference beam 72' is generated by the semiconductor laser 21, and collimated by the collimator lens 22. The collimated reference beam 72' is incident on the optical device 23 to be diffused and becomes the scattered reference beam 72. After passing through the optical device 24, the scattered reference beam 72 is combined with the signal beam 76 and then is incident on the light receiving array 25. Similarly to Example 9, this example uses the SELFOC lens array having a numeral aperture of 0.2 and being composed of SELFOC lenses each having a diameter of 1 mm. The light recieving array 25 is located away from the optical device 23 by 25 mm. In the array, the light receiving elements are arranged at a pitch of approximate 43 82 m. By this arrangement, a correspondence such as one-to-one is established between plane wave components in each direction of the scattered reference beam 72 and each of the light receiving elements. Accordingly, regardless of whichever light receiving element may receive the incident signal beam 76, it is possible to detect the beat signal obtained from the signal beam 76 and the scattered reference beam 72.

Similarly to Example 9, the optical heterodyne detecting device of Example 11 has an actuating portion (not shown). Accordingly, even if the deviation of the incident angle of the signal beam 76 occurs, stable detection keeping the sufficient intensity of the beat signal is assured, by rotating the optical device 24 with the use of the actuating portion.

Further, similarly to Example 10, Example 11 includes the arrangement of making the pitch between lenses small, i.e., making the repeat angle of the plane wave of the scattered reference beam 72 large, and rendering the numeral aperture of the lens small at the same time. This configuration makes it possible to adjust the signal beam 76 into the plane waves of the scattered reference beam 72, regardless of the extremely small angular range of the positional alignment.

Example 12

Figure 13:
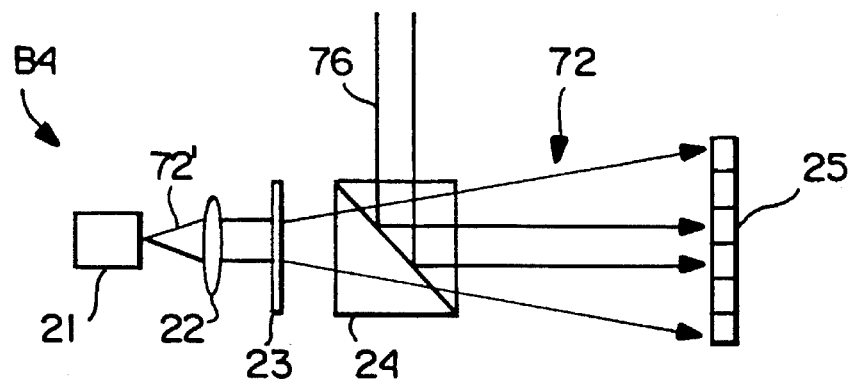
FIG. 13 is a view showing the system construction of an optical heterodyne detecting apparatus applied to a wireless optical communication system, according to a tenth example of the invention.
Figure 14:
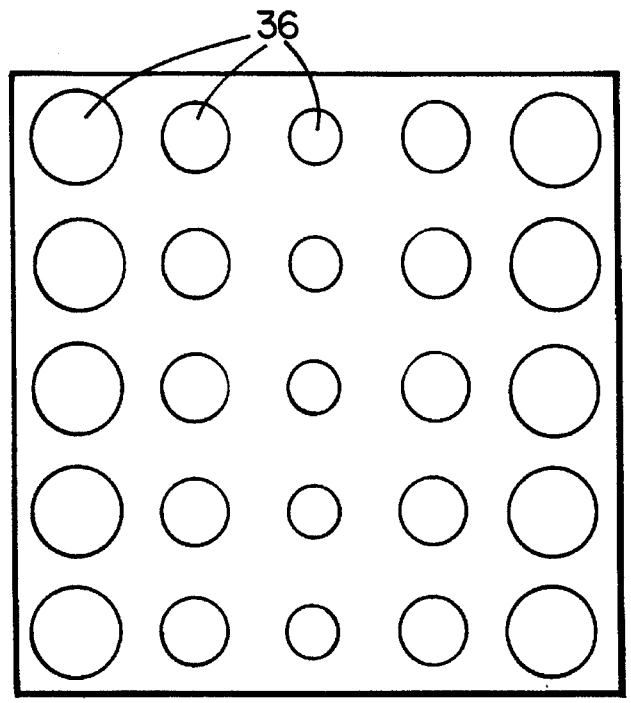
FIG. 14 is a schematic side view showing a main section of an optical heterodyne detecting apparatus according to a twelfth example of the invention.
Figure 15:
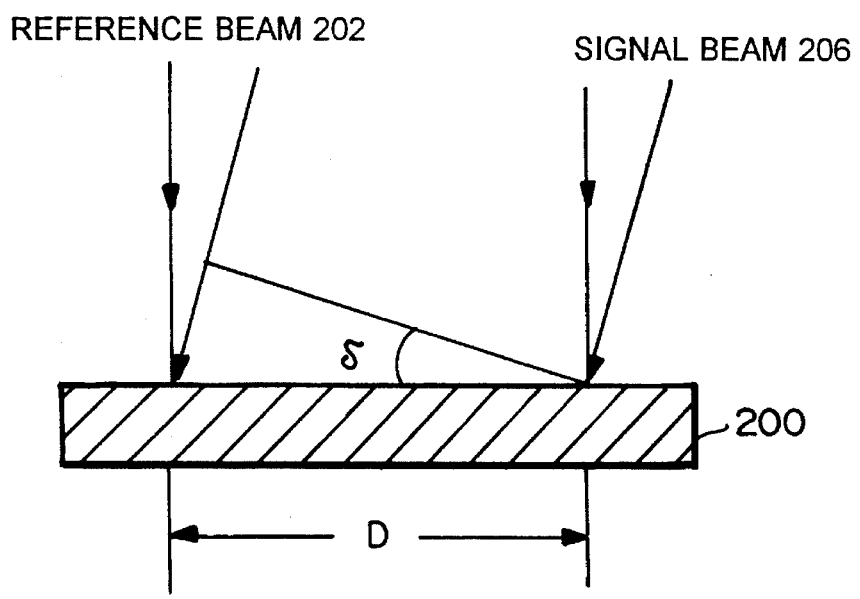
FIG. 15 is a view showing the concept of the case where a beat signal is obtained by a light receiving element based on two optical fluxes traveling in slightly different directions.
Figure 16:
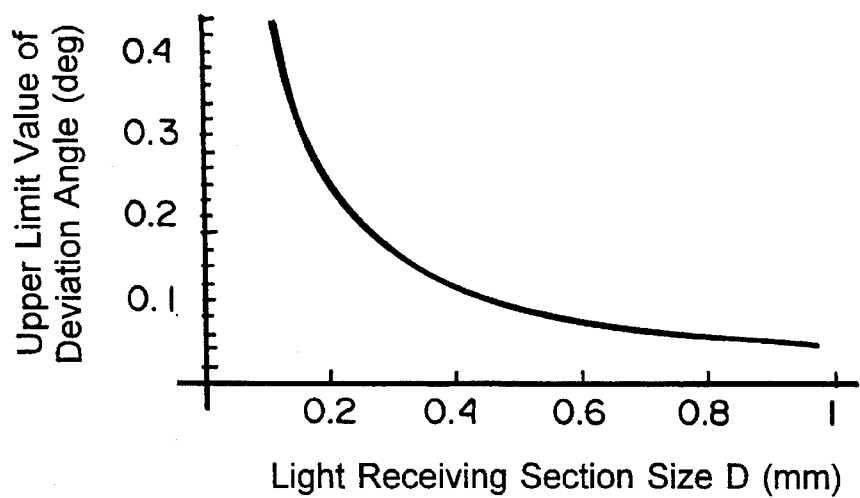
FIG. 16 is a graph showing the relationship between the size of a light receiving section and the upper limit value of a deviation angle at which the beat signal is not 0.

Example 12 employs a lens array shown in FIG. 14 as the optical device 23 in the optical heterodyne detecting apparatus shown in FIGS. 12 and 13. On this lens array, two neighboring lenses 36 are located apart from each other. The diameter of lenses 36 is smallest at the center portion, and larger as they come nearer to the circumference of the lens array. However, the lenses 36 are arranged at a regular pitch.

When the collimated reference beam 72' is incident on the center portion of the thus arranged lens array, the intensity of scattering plane waves of the scattered reference beam 72, caused by the lens array, is largest at a point of the scattering angle being approximately 0 degree and smaller at a larger scattering angle.

In the optical heterodyne detecting apparatus of Example 12, the beat signal is initially detected by the above-mentioned optical device 23 similarly to above examples. Here, if necessary, the positional alignment is performed by rotating the optical device 24 with the use of the actuating portion. Thereafter, the optical device 24 is rotated by the actuating portion in such a way that the most intense scattered plane wave is adjusted to the position of the light receiving element where the beat signal is detected. In this way, a beat signal having a stronger intensity than in the above examples is obtained in this example. Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is :

1. An optical heterodyne detection method for detecting a beat signal by optical heterodyne detection using a superimposition of two or more waves of beams including a wave of a signal beam and a wave of a reference beam, the method comprising the steps of:

generating a collection of plane waves having a certain solid angle by scattering the reference beam in two dimensions; and detecting the beat signal obtained from one of the plane waves and the wave of the signal beam by superimposing one of the plane waves and the wave of the signal beam.

2. An optical heterodyne detection method according to claim 1, wherein the beat signal corresponds to a frequency difference between the scattered reference beam and the signal beam.

3. An optical heterodyne detection method according to claim 1, wherein the beat signal corresponds to a phase difference between the scattered reference beam and the signal beam.

4. An optical heterodyne detecting apparatus for detecting a beat signal by an optical heterodyne detection using a superimposition of two or more waves of beams including a wave of a signal beam and a wave of a reference beam, the apparatus comprising:

a first optical means for generating a collection of plane waves having a certain solid angle by scattering the reference beam in two dimensions;

a second optical means for mixing the scattered reference beam and the signal beam by superimposing one of the plane waves and the wave of the signal beam; and a third optical means for receiving the mixed beams including the superimposed waves and detecting the beat signal obtained from one of the plane waves and the wave of the signal beam.

5. An optical heterodyne detecting apparatus according to claim 4, wherein the first optical means has a function of diffusing light and generates the scattered reference beam by the function.

6. An optical heterodyne detecting apparatus according to claim 5, wherein the first optical means is a diffusing plate.

7. An optical heterodyne detecting apparatus according to claim 5, wherein the first optical means is a reflection type diffusing plate.

8. An optical heterodyne detecting apparatus according to claim 5, wherein the first optical means is a multilayer lens.

9. An optical heterodyne detecting apparatus according to claim 5, wherein the first optical means is a multilayer mirror.

10. An optical heterodyne detecting apparatus according to claim 5, wherein the first optical means is a multilayer lens array.

11. An optical heterodyne detecting apparatus according to claim 5, wherein the first optical means is a multilayer mirror array.

12. An optical heterodyne detecting apparatus according to claim 4, wherein the first optical means has a function of diverging light and generates the scattered reference beam by the function.

13. An optical heterodyne detecting apparatus according to claim 12, wherein the first optical means has plural planes formed by a group of plane mirrors.

14. An optical heterodyne detecting apparatus according to claim 12, wherein the first optical means is a mirror array having mirrors arranged on one plane at a regular pitch.

15. An optical heterodyne detecting apparatus according to claim 12, wherein the first optical means is a lens array having lenses arranged on one plane at a regular pitch.

16. An optical heterodyne detecting apparatus according to claim 4, wherein the first optical means has a function of diffracting light and generates the scattered reference beam by the function.

17. An optical heterodyne detecting apparatus according to claim 16, wherein the first optical means is a diffraction grating having at least one hole and generating the reference beam by means of the hole.

18. An optical heterodyne detecting apparatus according to claim 4, further comprising:

a variable means for making the direction of the reference beam variable; and a control means for controlling the variable means on the basis of the beat signal detected by the third optical means.

19. An optical heterodyne detecting apparatus according to claim 18, wherein the first optical means has a function of transmitting light and a function of scattering light, and provides the reference beam with an intensity distribution of a plane wave at a scattering angle.

20. An optical heterodyne detecting apparatus according to claim 4, further comprising:

a variable means for making the direction of the signal beam variable; and a control means for controlling the variable means on the basis of the beat signal detected by the third optical means.

21. An optical heterodyne detecting apparatus according to claim 20, wherein the first optical means has a function of transmitting light and a function of scattering light, and provides the reference beam with an intensity distribution of a plane wave at a scattering angle.

22. An optical heterodyne detecting apparatus according to claim 4, wherein the beat signal corresponds to a frequency difference between the scattered reference beam and the signal beam.

23. An optical heterodyne detecting apparatus according to claim 4, wherein the beat signal corresponds to a phase difference between the scattered reference beam and the signal beam.

24. An optical heterodyne detection method for detecting a beat signal by optical heterodyne detection using a superimposition of two or more beams including a signal beam and a reference beam, the method comprising the steps of:

continuously varying a direction of the signal beam;

generating a scattered reference beam from the reference beam; and detecting the beat signal obtained from the scattered reference beam and the signal beam whose direction is varied by superimposing the scattered reference beam and the signal beam.

25. An optical heterodyne method for detecting a beat signal by optical heterodyne detection using a superimposition of two or more beams including a signal beam and a reference beam, the method comprising the steps of:

generating a scattered reference beam from the reference beam, a direction of the scattered reference beam being continuously varied; and detecting the beat signal obtained from the scattered reference beam and the signal beam by superimposing the scattered reference beam and the signal beam.

* * * * *